UNITED STATES PATENT OFFICE.

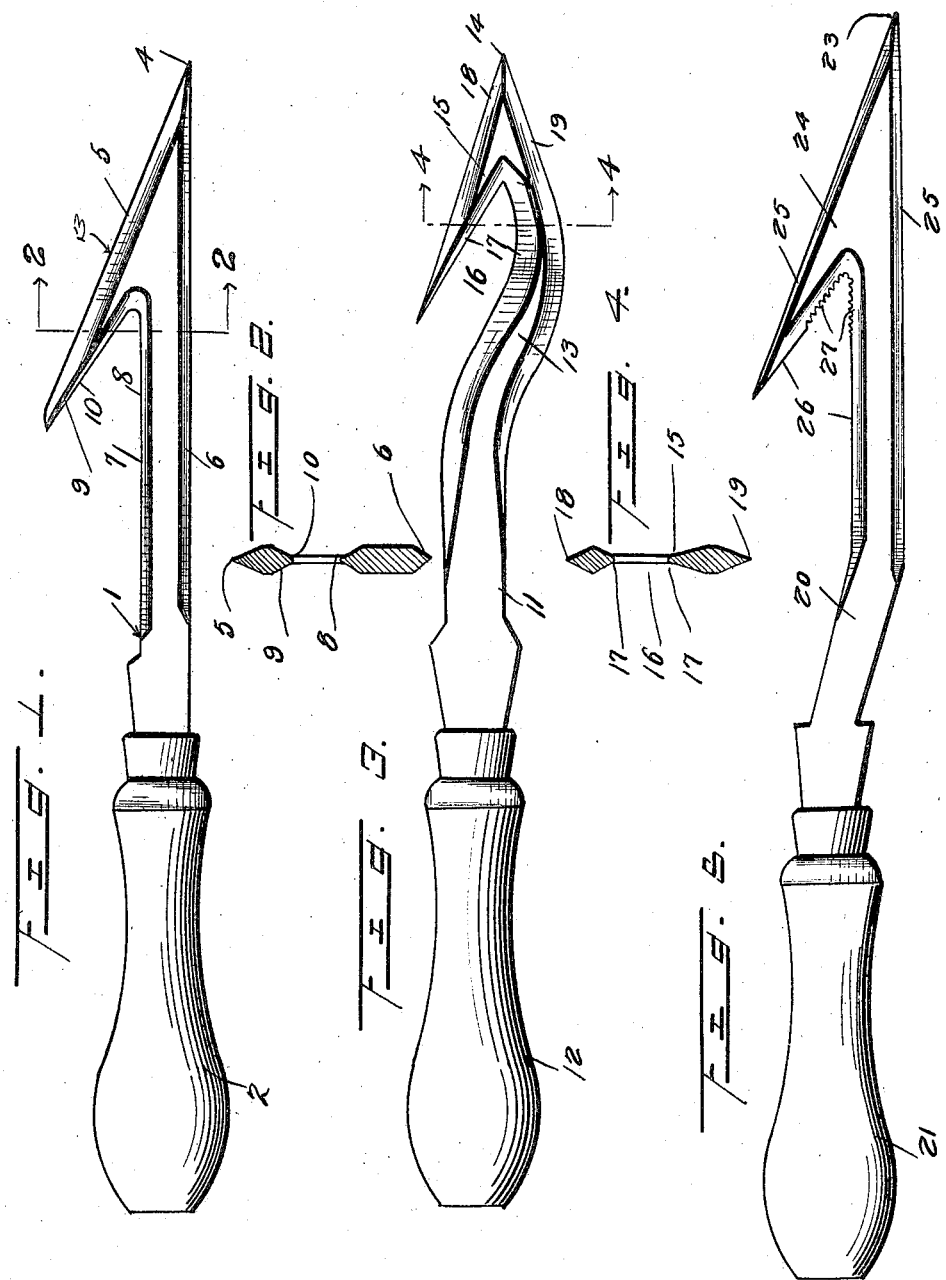

MAURICE FRANCO, OF NEW YORK, N. Y.

WEED-PULLER.

1,398,850.   Specification of Letters Patent.   Patented Nov. 29, 1921.

Application filed December 16, 1919. Serial No. 345,225.

*To all whom it may concern:*

Be it known that I, MAURICE FRANCO, a citizen of Great Britain, residing at New York, in the county of New York and State of New York, have invented certain new and useful Improvements in Weed-Pullers; and I do hereby declare the following to be a full, clear, and exact description of the invention, such as will enable others skilled in the art to which it appertains to make and use the same.

This invention relates to new and useful improvements in weed pullers and has for one of its objects the provision of a device of this character whereby weeds along with their roots can be easily and quickly extracted from the ground without the danger of severing the stalk of the weed and permitting the roots thereof to remain in the ground for further growth.

Another object of this invention is the provision of a weed puller of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a plan view of a weed puller constructed in accordance with my invention, Fig. 2 is a transverse sectional view taken on the line 2—2 of Fig. 1, Fig. 3 is a plan view of a modified form of weed puller, Fig. 4 is a transverse sectional view taken on the line 4—4 of Fig. 3, Fig. 5 is a plan view illustrating another modified form of my invention.

Referring in detail to the drawings, the numeral 1 indicates a shank having secured to one end a suitable handle 2, while the other end of the shank has formed thereon a barb 3 which extends approximately forty-five degrees to the shank. The barb 3 and the last named end of the shank terminate in an extremely sharp point 4 so that the device can be readily and conveniently inserted in the ground to permit the stalk of a weed to be caught between the shank and the inner edge of the barb 3.

A beveled cutting edge 5 is formed upon the outer edge of the barb 3 and extends from the end of the barb to the sharp point 4. One edge of the shank 1 is provided with beveled faces to form a cutting edge 6 that coöperates with the cutting edge 5 when inserting the tool in the ground for engagement with a weed. The other edge of the shank 1 is provided with beveled faces 7 to define a gripping edge 8. The inner edge of the barb 3 is provided with beveled faces 9 so as to form a gripping edge 10 that coöperates with the gripping edge 8 in grasping or gripping the stalk of a weed when placed between the barb and the shank. The gripping edges 8 and 10 are not extremely sharp so as to obviate the danger of severing the stalk of the weed when extracting the weed with its roots from the ground.

In operation, the tool is held at an angle of approximately forty-five degrees and is inserted in the ground adjacent a weed and after being inserted in the ground, the weed is then caught between the barb and the shank by swinging the tool slightly laterally and then by pulling on the handle, the weed with its root is conveniently and readily extracted from the ground.

Referring to my modified form of invention as shown in Figs. 3 and 4, it consists of a shank 11, having secured to one end a comparatively long handle 12 providing a construction wherein it is not necessary for the user to stoop over when inserting the tool into the ground for extracting weeds. The shank 11 in this instance has a compound curve 13 terminating in a pointed end 14. A barb 15 is formed on the pointed end of the shank 11 and coöperates with the shank in forming a weed receiving space 16. The shank having a compound curve 13 provides a comparatively large weed receiving space so that weeds that have stalks of considerable size can be readily caught therein. The shank 11 and inner edge of the barb 15 have coöperating gripping edges 17, so that the stalk of a weed can be readily gripped between the barb and the shank. The outer edge of the barb 15 is sharpened to form a cutting edge 18 that coöperates with a cutting edge 19 formed on the other edge of the shank 11 so that the device can be readily inserted into the ground.

Referring to Fig. 5 illustrating another modified form of my invention, the shank 20 has one end disposed angularly and secured to a handle 21. The other end of the shank is pointed as shown at 23, and has formed thereon a barb 24. The barb and shank have their outer edges beveled to form cutting edges 25. The inner edge of the barb and the other edge of the shank are beveled to define gripping edges 26. The gripping edges 26 are provided with serrations 27 adapted to bite into the stalk of a weed so that said weed can be extracted from the ground without the danger of the stalk slipping between the gripping edges 26.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A weed puller comprising a shank, a handle secured to said shank, one end of said shank being reduced to form an extremely sharp point, a barb formed on the last named end of the shank and coöperating with the shank in forming a weed receiving space, gripping edges formed on the barb and shank, and cutting edges formed on the barb and shank to permit easy insertion of the tool into the ground.

2. A weed puller comprising a shank, an angularly related barb formed on said shank, said barb and shank terminating in a pointed end, cutting edges formed on the outer edges of the shank and barb, gripping edges formed on the inner edge of the barb and the other edge of the shank, and serrations formed in the gripping edges.

In testimony whereof I affix my signature in presence of two witnesses.

MAURICE FRANCO.

Witnesses:
 EDWARD I. TRAPHAGAN,
 ALEX E. HAGERTY.